US006974217B2

(12) United States Patent
Kimura et al.

(10) Patent No.: US 6,974,217 B2
(45) Date of Patent: Dec. 13, 2005

(54) PROJECTOR EXECUTING KEYSTONE CORRECTION

(75) Inventors: Keishi Kimura, Matsumoto (JP); Takaaki Koyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/465,879

(22) Filed: Jun. 20, 2003

(65) Prior Publication Data
US 2004/0041985 A1 Mar. 4, 2004

Related U.S. Application Data

(63) Continuation-in-part of application No. 10/386,534, filed on Mar. 13, 2003.

(30) Foreign Application Priority Data

| Mar. 20, 2002 | (JP) | 2002-79313 |
| Jun. 20, 2002 | (JP) | 2002-180265 |
| Jun. 5, 2003 | (JP) | 2003-160374 |

(51) Int. Cl.[7] .......... G03B 21/00; G03B 21/14
(52) U.S. Cl. .......... 353/69; 353/70
(58) Field of Search .......... 348/745, 806; 353/69, 70, 121

(56) References Cited

U.S. PATENT DOCUMENTS

| 5,355,187 A | * | 10/1994 | Ogino et al. .......... 353/38 |
| 5,537,168 A | * | 7/1996 | Kitagishi et al. .......... 353/101 |
| 5,788,355 A | * | 8/1998 | Na .......... 353/101 |
| 6,362,573 B1 | * | 3/2002 | Helbing et al. .......... 315/155 |
| 6,481,855 B2 | * | 11/2002 | Oehler .......... 353/70 |
| 6,520,647 B2 | * | 2/2003 | Raskar .......... 353/70 |
| 6,686,973 B2 | * | 2/2004 | Su .......... 348/745 |
| 2003/0068094 A1 | * | 4/2003 | Kimura et al. .......... 382/274 |
| 2004/0036844 A1 | * | 2/2004 | Wood et al. .......... 353/70 |

FOREIGN PATENT DOCUMENTS

| JP | A 7-270748 | 10/1995 |
| JP | A 8-9306 | 1/1996 |
| JP | A 10-111533 | 4/1998 |
| JP | 11-282438 | 10/1999 |
| JP | 2000-196978 | 7/2000 |
| JP | 2000-241874 | 8/2000 |
| JP | A 2001-69433 | 3/2001 |
| JP | 2001-186538 | 7/2001 |
| JP | 2001-339671 | 12/2001 |
| JP | A 2002-112148 | 4/2002 |
| JP | 2002-268142 | 9/2002 |

* cited by examiner

Primary Examiner—Judy Nguyen
Assistant Examiner—Andrew Sever
(74) Attorney, Agent, or Firm—Oliff & Berridge, PLC

(57) ABSTRACT

An automatic keystone correction which enables even an inexperienced user to easily obtain an image corrected using the keystone distortion during a tilted projection. The projector detects varying of its elevation angle by using an elevation detecting module. When the angle stops varying, the projector determines that the elevation adjustment by the user ends, and executes auto keystone correction of the input image according to the elevation angle.

10 Claims, 16 Drawing Sheets

PROJECTOR EXECUTING KEYSTONE CORRECTION

This is a Continuation-In-Part of application Ser. No. 10/386,534 filed Mar. 13, 2003.

BACKGROUND OF THE INVENTION

1. Field of Invention

This invention relates to a projector which performs a keystone correction of an image during tilted projection.

2. Description of Related Art

Projectors project images onto screens. In some cases, projectors are set at a low position and project images onto screens that are set at a relatively higher position, which is called "tilted projections". During the tilted projections, images projected on the screens are distorted to trapezoidal shapes from rectangular shapes due to an elevation angle in the tilted projection. Such a distortion is called "a keystone distortion".

Related art projectors may include a special button and menu to correct the keystone distortion. A user can adjust the keystone distortion manually with this button and menu. Some related art projectors automatically detect the elevation angle and correct the keystone distortion in response to an instruction from the user.

SUMMARY OF THE INVENTION

However, for inexperienced users, it is hard to recognize the function of causing the projector to perform the auto keystone correction. Moreover, even if the user knows the function, it often takes the user a long time to understand actual operations for the correction when the type of the projector is unfamiliar for the user.

This invention addresses or solves the above-mentioned problem by providing a technique to make a projector execute an auto keystone correction easily, even when an inexperienced user operates it.

This invention provides a projector that performs a keystone correction of a projected image during a tilted projection. The projector includes a trigger determination module, an elevation detecting module, and a keystone correction module. The trigger determination module determines a predetermined trigger state that is included in normal procedure to project an image except for an instruction to perform a keystone correction. The elevation detecting module detects an elevation angle of the projector. The keystone correction module performs a keystone correction based on the elevation angle in response to the trigger state. For instance, an angle sensor or a G-sensor is applicable for the detection of the elevation angle.

The projector of this invention can automatically execute the keystone correction. Because the trigger state is not a specified operation to instruct the correction but one of states included in the normal procedure, any user can cause the projector to perform the correction without any knowledge about the correction. As a result of this, for example, a presentation with the projector can be started with no loss of time.

Various modifications may be made to the trigger state. As a first exemplary embodiment, the projector further includes an operation determination module that is configured to determine a user operation which is required to projecting an image. The trigger state may include the user operation.

The user operation may include an operation for a power supply. In this case, the keystone correction can be executed in response to the power supply.

When the projector includes an elevation adjustment mechanism, such as stay adjusters, configured to adjust the elevation angle of the projector, the user operation may include an operation of the elevation adjustment mechanism. In this case, the keystone correction can be executed in response to the elevation angle adjustment.

Additionally, the user operation may include various operations, such as focus adjustment, zooming, connecting an image source, and switching to another image source. The image source may include various apparatus, such as DVD players, personal computers, and VCRs, which can be the input source of the image to be projected by the projector. As is mentioned above, the user operation may include various operations required for the user to project images with the projector.

As a second exemplary embodiment, the projector of this invention may further include a light source lamp and an light-on detecting module that is configured to detect a light-on state of the light source lamp. In this case, the trigger state may include the light-on state.

In the second exemplary embodiment, the keystone correction can be executed in response to the light-on of the light source lamp. The accuracy of keystone correction may be affected by noises due to the high voltage of the light source lamp. Therefore, it is preferable to execute the correction after the light source lamp lights and a predetermined time passes.

As a third exemplary embodiment, the trigger state may include a variation of the elevation angle. In this embodiment, the keystone correction can be executed when the elevation angle of the projector is changed without any specified operation for the correction. In the third embodiment, the trigger state may include a state that the elevation angle stops varying.

In this case, for example, the state can be detected when a varying rate of the elevation angle decreases below a predetermined value after exceeding over the value once. This detection can reduce a measurement error of the elevation angle due to environmental factors, such as thermal drift of the sensor, thereby stabilizing the correction.

As a fourth exemplary embodiment, the projector of this invention may include an optical unit that modulates light flux illuminated from a light source according to image data so as to form an optical image and performs an extended projection of the optical image, and an elevation adjustment mechanism configured to adjust the tilted state of the optical unit. This invention determines completion of an operation for the elevation adjustment mechanism and measures a tilted state of the optical unit in response to the completion. Thus, the completion of the operation can be a trigger for executing the correction which makes it possible to execute the distortion correction after setting the projector without delay. The distortion correction includes the keystone correction.

In the fourth exemplary embodiment, the projector may perform a function of a forced distortion correction that is executed in response to a specified user operation regardless of operations to the elevation adjustment mechanism, in addition to the automatic distortion correction described above. The forced distortion correction enables the user to instruct re-execution of the distortion correction in a case where the automatic distortion correction is not appropriately executed. The forced distortion correction may be instructed in various ways including the following: by a switch for the specified purpose and by specified operations to a power supply switch or focus ring.

The distortion correction can be executed in various manners including the following: 1) calculating a distortion correction value of the optical image according to the tilted state and executing the distortion correction based on the distortion correction value; and 2) executing the distortion correction directly using the tilted state instead of converting it into the distortion correction value.

In the fourth exemplary embodiment, the distortion correction may be executed in a case where an elapsed time from the start of the adjustment by the elevation adjustment mechanism exceeds a predetermined threshold. The elapsed time can be measured by using a timer that starts measuring time in response to the start of the adjustment of adjusting the elevation adjustment mechanism. The elapsed time is rather short in a case where the user erroneously operates the elevation adjustment mechanism, so this exemplary embodiment reduces or prevents unintended distortion correction in response to such erroneous operations. The threshold may also be arbitrarily set. For example, it can be set based on a required time to make a significant change of the tilted state of the projector by operating the elevation adjustment mechanism.

In the fourth exemplary embodiment where the elevation adjustment mechanism is power-driven, the adjust-completion-determining-module may determine the completion of the operation in a case where power-driving of the elevation adjustment mechanism is stopped. Various actuators, such as a stepping motor, can be applicable as the power source to drive the elevation adjustment mechanism. In one example where the elevation adjustment mechanism includes a variable length stay configured to stay the projector and an adjust switch configured to control the extending and contracting of the stay, the adjust-completion-determining-module may determine the completion of the operation in a case where the adjust switch is turned off.

In another example where the elevation adjustment mechanism includes a plurality of stay mechanisms configured to stay the projector and individually extend and contract, the adjust-completion-determining-module may determine the completion of the operation in either a case where all operations for the plurality of the stay mechanisms are completed or a case where a part of the operations is completed. The former case reduces or prevents unintended distortion corrections when only a part of the operations is completed.

In one example of the former case where the projector includes a package installing an optical unit therein, a plurality of stays extending from the package and a plurality of stay adjusting switches to control extending and contracting of the stays may determine the completion of the operation in a case where all of the stay adjusting switches turns off.

In the fourth exemplary embodiment, the tilted state may be measured in various ways. For example, a gyro sensor to measure the tilted angle or an G-sensor to measure acceleration are applicable. In the latter case, for example, the G-sensor, which is mounted on a board horizontally fixed in the projector, can determine the tilted angle by measuring the component of the gravity varying according to the tilted angle. To ensure the accuracy of the measurement, these sensors are preferably mounted on a rear half of the projector to the opposite side of a supporting point for tilting the projector, that is, the distance between the sensor and the supporting point is larger than the distance between the sensor and the opposite side. Instead of using these sensors, the tilted state may be calculated according to the state of the elevation adjustment mechanism. For example, in the elevation adjustment mechanism using the stays, the tilted angle can be calculated according to the extended length of the stays.

The application of the present invention is not restricted to the projector. There are, however, many other diverse applications, such as a method for correcting keystone distortion of a projected image during a tilted projection of a projector, a computer program that causes a computer to perform the keystone correction, and a computer readable recording medium in which the computer program is recorded, for example. Typical examples of the recording medium include: flexible disks, CD-ROMs, magnet-optic discs, IC cards, ROM cartridges, punched cards, prints with barcodes or other codes printed thereon, internal storage devices (memories such as a RAM and a ROM, for example) and external storage devices of the computer, and a variety of other computer readable media, for example.

DETAILED DESCRIPTION OF PREFERRED EMBODIMENTS

Figure 1:
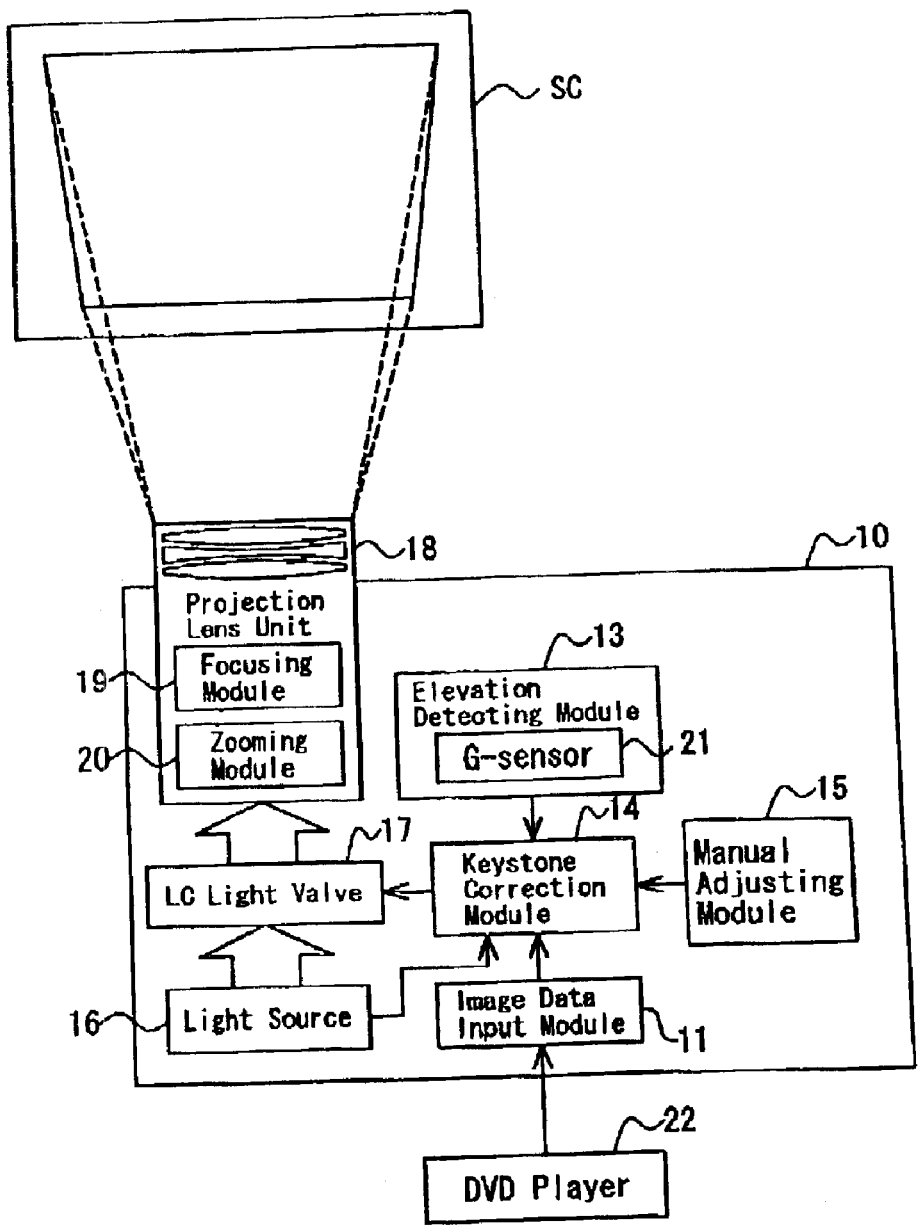
FIG. 1 is a schematic that shows the general construction of the projector used for the following various exemplary embodiments.

Exemplary embodiments of the present invention are discussed below in the following sequence:

A. First Exemplary Embodiment
(A1) General Construction of Projector
(A2) Auto Keystone Correction Process
B. Second Exemplary Embodiment
C. Exemplary Modifications D. Third Exemplary Embodiment
(D1) General Construction of Projector
(D2) Detailed Construction of Optical Unit
(D3) General Construction of Control Unit
(D4) Keystone Correction
(D5) Effects of Third Exemplary Embodiment
(D6) Exemplary Modification of Third Exemplary Embodiment
(D7) Other Exemplary Modifications of Third Exemplary Embodiment A. First Exemplary Embodiment (A1) General Construction of Projector FIG. 1 is a schematic that shows the general construction of the projector used for the following first and second exemplary embodiments. The projector 10 includes an image data input module 11, an elevation detecting module 13, a keystone correction module 14, a manual adjusting module 15, a light source 16, a LC (Liquid Crystal) light valve 17, and a projection lens unit 18.

The image data input module 11 inputs image data from various image output devices. FIG. 1 shows a DVD player 22 as an example of an image output device. The image output devices may include VCRs and personal computers, for example. Moreover, the image data may be delivered via a network.

The elevation detecting module 13 detects the elevation angle of the projector 10 by using G-sensor 21. The principle as to how to detect the elevation angle is described later. The detected elevation angle is transmitted to the keystone correction module 14.

The keystone correction module 14, provided by using a micro-computer with CPU and memories, executes a keystone correction to the image data that is transmitted from the image data input module 11. In this case, the degree of the correction is adjusted according to the elevation angle that is transmitted from the elevation detecting module 13. Moreover, the keystone correction module 14 can perform the correction according to a correction instruction by the user, which is transmitted from the manual adjusting module 15.

The manual adjusting module 15 includes a power supply switch, and a button which allows the user to manually adjust the degree of the keystone correction. The projector 10 is able not only to correct the image by the keystone correction module 14 automatically, but also to perform a manual correction. Accordingly, the user can make a fine adjustment to the image, for instance, after the automatic correction by the keystone correction module 14. The manual adjusting module 15 may be installed in the projector 10, and may also be a remote controller using infrared rays etc.

The light source 16 includes a light source lamp, and a polarization converting device which converts the light from the light source lamp into linear polarized light.

The image that is corrected by the keystone correction module 14 is formed on the LC light valve 17. The image that is transmitted from the image data input module 11 can be directly formed thereon when such a correction is not required.

The LC light valve 17 is illuminated by the light from the light source 16, and the image formed thereon is projected onto the screen SC through the lenses included in the projection lens unit 18.

The projection lens unit 18 includes a zooming module 20 to scale the projected image, and a focusing module 19 to adjust foci according to the distance between the projector and the screen.

Figure 2:
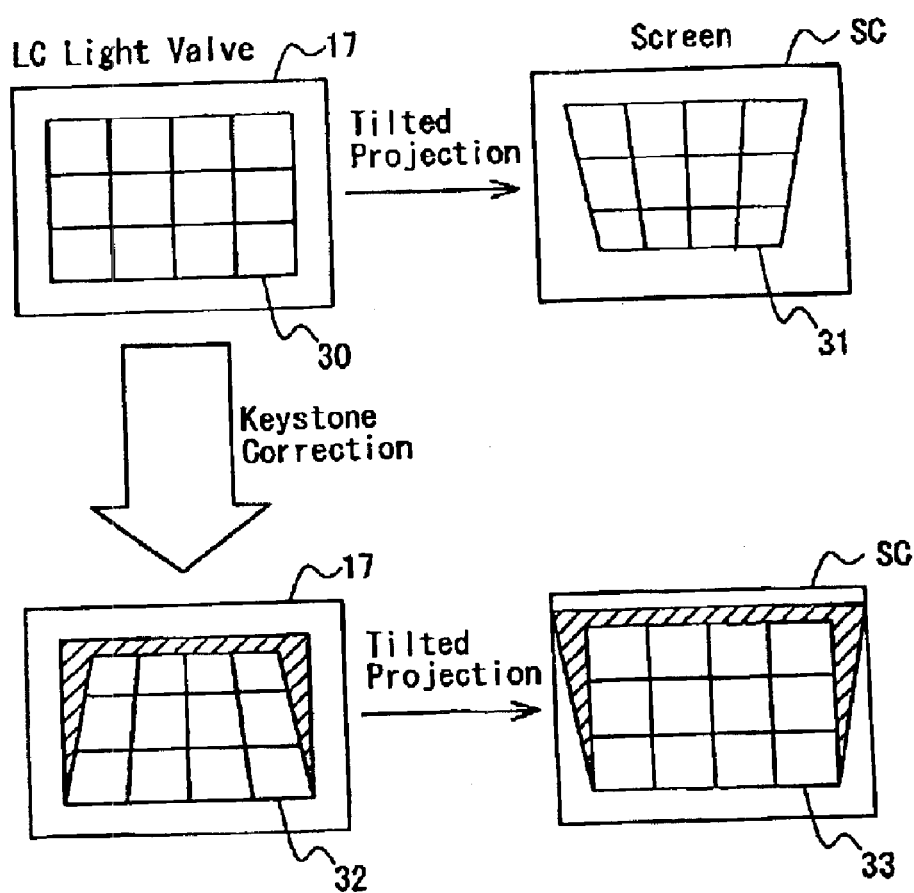
FIG. 2 is a schematic that shows the relationship between the projected image on the screen SC and the image formed on the LC light valve 17.

FIG. 2 is a schematic that shows the relationship between the projected image on the screen SC and the image formed on the LC light valve 17. The grid shows the image in FIG. 2. When a tilted projection is performed, the image 30 formed on the LC light valve 17 is projected as the image 31 on the screen SC with the trapezoidal shape. To correct such a trapezoid distortion or a keystone distortion, the keystone correction module 14 corrects the image 30 like image 32 according to the elevation angle of the projector 10, and sets a surrounding blank (hatching part in FIG. 2) to the black area. This correction eliminates the distortion from the projected image 33 on the screen SC during the tilted projection.

Figure 3:
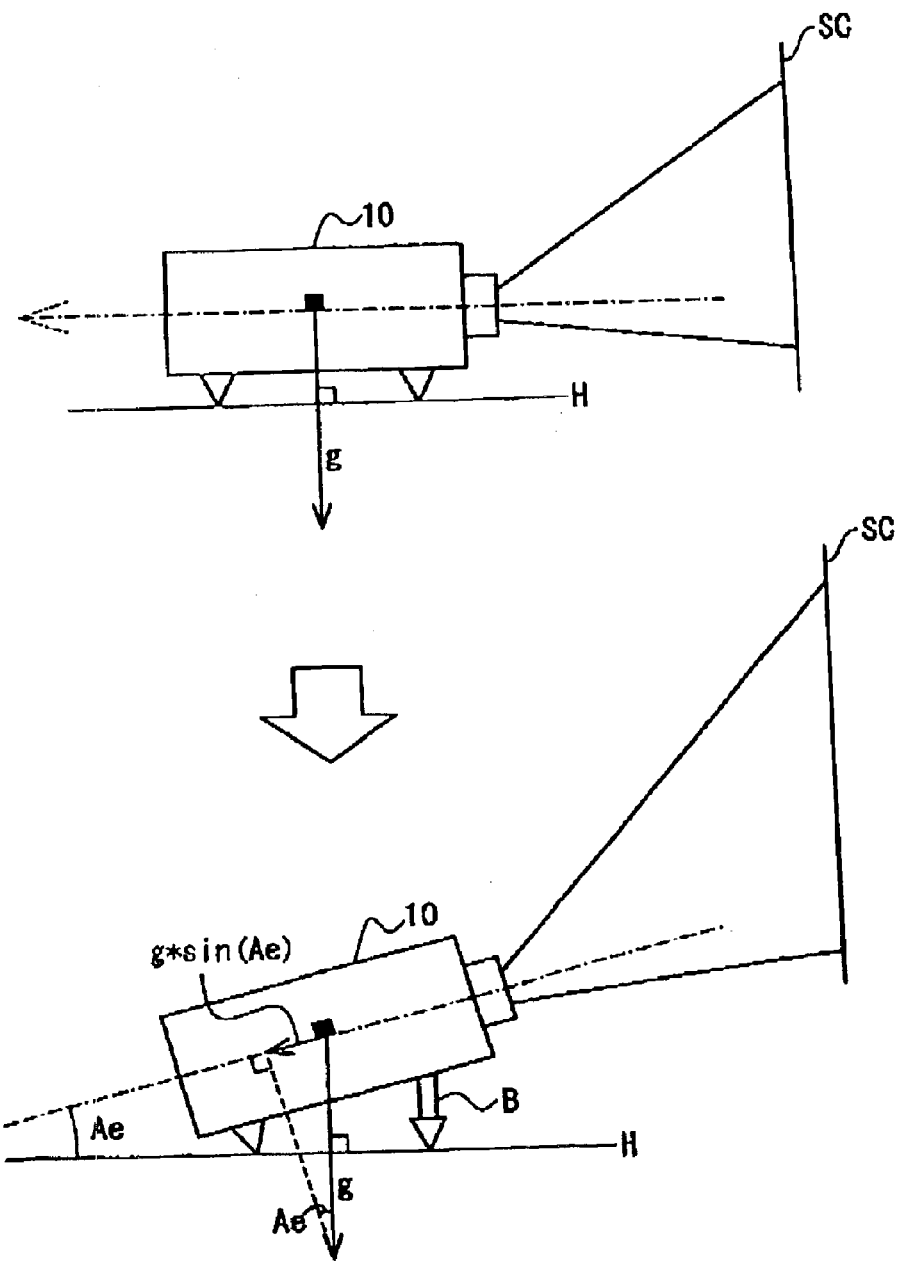
FIG. 3 is a schematic that shows the principle of detecting the elevation angle of the projector 10.

FIG. 3 is a schematic that shows the principle of detecting the elevation angle of the projector 10. FIG. 3 shows right side views of the projector 10, the level floor H on which the projector 10 is placed, and the screen SC. The level floor H is assumed to be horizontal. G-sensor 21 is installed to detect the elevation angle of the projector 10 in this embodiment, as mentioned above. MAS1370P of Mitsubishi Electric Corporation may be used as the G-sensor 21, for example. G-sensor 21 is mounted in the projector 10 and detects the acceleration in the direction of the left side (rear side of the projector 10) on the chain line shown in the upper part of FIG. 3. When the projector 10 is horizontally set on the level floor H and no gravity works along the chain line, the acceleration output from the G-sensor 21 equals zero.

The lower part of FIG. 3 shows the projector 10 set diagonally by adjusting the height of the length of the stay B. Projecting images on the screen SC in such a state is called "a tilted projection". When the elevation angle is assumed to be Ac, the acceleration element along the chain line equals "g×sin(Ac)" as shown in FIG. 3. G-sensor 21 outputs the voltage corresponding to the acceleration element. In above-mentioned MAS1370P, the voltage of about 17 mV per the elevation angle of 1 degree (acceleration 0.167 m/s$^2$ (=9.8 m/s$^2$×0.017)) is output. Therefore, when the elevation angle is 10 degrees, the output of the sensor becomes about 170 mV (=10×17 mV), for instance. The elevation detecting module 13 can detect the elevation angle of the projector 10 based on the voltage output from the G-sensor 21 like this.

Other various detection devices and methods are applicable to detect the elevation angle, and the invention is not restricted to the G-sensor used in this exemplary embodiment. For instance, the elevation angle can be calculated based on the length of the stay, and also detected with an angle sensor which uses a pendulum.

(A2) Auto Keystone Correction Process

Figure 4:
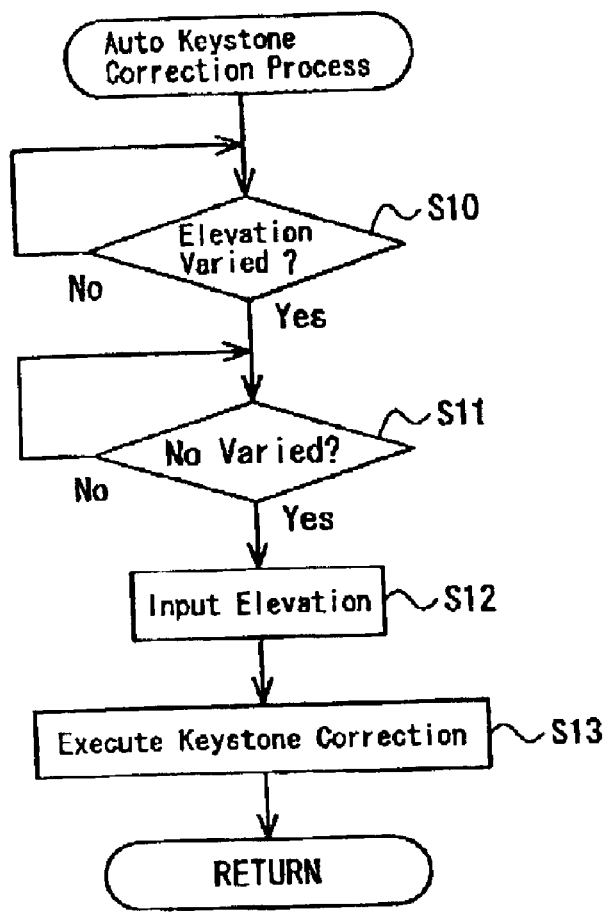
FIG. 4 is a flowchart of an auto keystone correction process in the projector 10.

FIG. 4 is a flowchart of an auto keystone correction process in the projector 10. This process is performed by the keystone correction module 14 and using the elevation detecting module 13. First, the keystone correction module 14 detects the variation of the elevation angle by using the elevation detecting module 13 (step S110). The variation suggests that the user starts setting of the projector 10 for a tilted projection.

Figure 5:
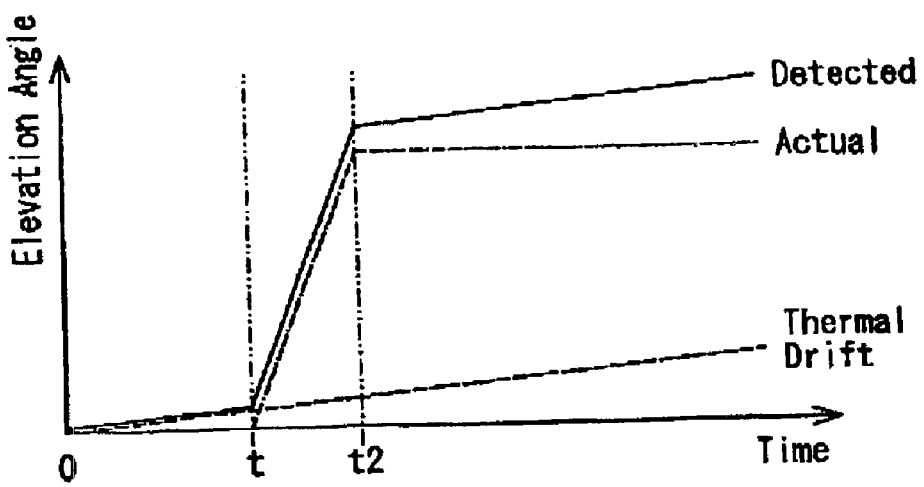
FIG. 5 is a graph showing varying the elevation angle of the projector 10.

FIG. 5 is a graph showing varying the elevation angle of the projector 10. The abscissa axis shows the time passage, and the coordinate axis shows the elevation angle. The elevation angle grows after the time "0" when the user turns on the power supply of the projector and the time "t" when the adjustment of the elevation angle of the projector begins. When the adjustment is ended at the time "t2", the elevation angle achieves a constant value. The chain line, labelled in FIG. 5 as "Actual", shows this series of variations of the elevation angle.

On the other hand, the dotted line, labelled in FIG. 5 as "Thermal Drift", shows an increase in detected angle by thermal drift of the G-sensor 21. The temperature rises up to about 75° C. in the projector with the time passage due to the heat of the strong light source lamp. Therefore, the output value of the G-sensor may increase by the influence of the heat like the dotted line of shown in FIG. 5, even when the elevation angle of the projector is actually 0. For instance, the output error rises up to 2 degrees when the temperature is 75° C., in above-mentioned MAS1370P.

This thermal drift causes the detected angle by the elevation detecting module 13 to rise like a solid line labelled in FIG. 5 as "Detected", which is summation of the thermal drift and the actual angle.

The thermal drift increases gradually for a few minutes, while the adjustment of the elevation angle by the user lasts a few seconds. Accordingly, in this exemplary embodiment, when the time differentiation of the detected angle exceeds a prescribed value, the keystone correction module 14 determines that as the start varying of the elevation angle, so as to clearly distinguish the adjustment by the user from the thermal drift.

Specifically, the start of the variation of the elevation angle can be determined under the following condition: the elevation detecting module 13 detecting the elevation angle using the G-sensor 21 every 0.7 seconds, and the difference between last detected angle and the angles detected eight times in the past being three degrees or more. This condition performs an acute detection of the start varying of the elevation angle, even when the thermal drift occurs up to two degrees.

Referring back to FIG. 4, when no variation of the angle is detected at step S10, the keystone correction module 14 keeps observing the angle variation by looping this step. In this way, the keystone correction module 14 can detect whether the tilted projection is applied or not by the user at anytime while the projector 10 works.

Next, the keystone correction module 14 detects whether the detected angle varies less than three degrees compared with the past detected angle (step S11). The process proceeds to the next step, when the variation is less than three, and it can be assumed that the user has stopped installing the projector 10. Otherwise, the keystone correction module 14 keeps observing the end of the installation by looping this step.

The keystone correction module 14 inputs the elevation angle from the elevation detecting module 13 (step S12), and executes the keystone correction of the image according to the elevation angle (step S13) when the completion of the installation is detected, based on the two above-mentioned steps. Thus, the projector 10 can automatically execute the keystone correction of the image due to the tilted projection without a specified operation by the user.

The image may be corrected in real time simultaneously with the elevation angle adjustment by the user, after varying of the angle is detected, while the distortion is corrected after the installation ends in the above-mentioned process. This allows the user to view the corrected image with no delay during the elevation angle adjustment.

B. Second Exemplary Embodiment

Figure 6:
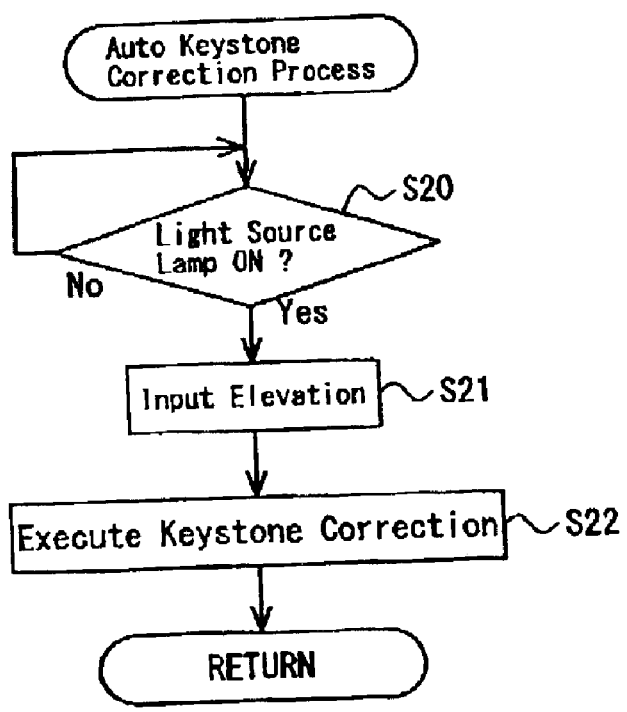
FIG. 6 is a flowchart of an auto keystone correction process of a second exemplary embodiment.

The trigger of auto keystone correction is not restricted to the variation of the elevation angle applied in the exemplary embodiment. FIG. 6 is a flowchart of an auto keystone correction process of the second exemplary embodiment.

First, the keystone correction module 14 detects the light source lamp in the light source 16 lighting (step S20). This detection can be executed by detecting voltage being applied to the power supply line to the light source lamp, for instance. Moreover, a photo-sensor mounted in an arbitrary location that is illuminated by the light source lamp can be used to detect the lighting. In the latter case where a photo-sensor is used the lighting should be detected when the brightness of the light source lamp reaches a prescribed brightness.

The keystone correction module 14 keeps observing the light source lamp by looping this step, in the case where no lighting is detected at step S20. The keystone correction module 14 inputs the elevation angle from the elevation detecting module 13 (step S21), and executes keystone correction based on this angle, when the lighting is detected (step S22). According to this process, keystone correction can be executed in response to a trigger of the lighting of the light source lamp.

It is preferable to input the elevation angle in above-mentioned step S21 after the predetermined time has passed since the lighting was detected at step S20. That is because the noise due to the high voltage, generated by lighting the light source lamp, affects the accuracy of the G-sensor 21.

The trigger is not restricted to the lighting applied in the second exemplary embodiment, and instead various triggers can be used, such as the elevation angle adjustment using the stay, and turning on the power supply, for example. In the latter case, the above-mentioned step S20 that is can be omitted. The operation of the focusing module 19 or the zooming module 20 that is installed in projection lens unit 18 can also be used as the trigger. Keystone distortion is affected by projection distance or projected area, and it is preferable that the amount of the adjustment of the focusing module 19 or the zooming module 20 is reflected in the correction at step S22, thereby executing the correction according to the projection distance and the projected area.

C. Exemplary Modifications

Various modifications can be made to the above first and second exemplary embodiments. Even if the user horizontally sets up projector 10, the elevation detecting module 13 occasionally detects a constant angle. This is an inevitable problem that is caused by the difference of the quality in the manufacturing process of the G-sensor 21 and secular change of sensitivity. Therefore, the elevation detecting module 13 may store the constant angle in advance in the memory in the projector, and determine the angle by subtracting the constant angle from the detected angle. This detection can achieve more accurate correction. The constant angle may be stored in the factory, and also by users after shipping. The manual adjusting module 15 or some specified menus can be used by the user to store the constant angle.

The keystone correction at step S13 or step S22 may be prohibited when the elevation angle that is input at step S21 or step S12 is negative, while the keystone correction executes at every elevation angle in the above-mentioned embodiments. That is because, in that case, the projector is assumed to hang from a ceiling in an upset state by a user who is highly skilled in operating the projector and for whom a manual adjustment button would be more intuitive and easy to understand.

The keystone correction may also be prohibited when right-left reversing projection of the projector is applied, because the user is assumed to be highly skilled.

Moreover, the keystone correction may also be prohibited when the initial detected angle input by the keystone correction module 14 at step S13 and step S22 is very small (for instance, range of +4 degree and −4 degree). That is because such an angle is possibly a detection error due to secular change of the G-sensor 21 or thermal drift and the projector is possibly set in a horizontal state at the end of the installation.

Additionally, during the distortion correction at step S22 in step S13, the amount of the correction or the elevation angle that is input by the keystone correction module 14 may be projected onto the screen SC. This could inform the user of a standard of the elevation angle when the user sets up the projector afterwards. Moreover, it is preferable to inform the user by a beep sound or same other alerting method when the automatic distortion correction function works.

D. Third Exemplary Embodiment (D1) General Construction of Projector

Figure 7:
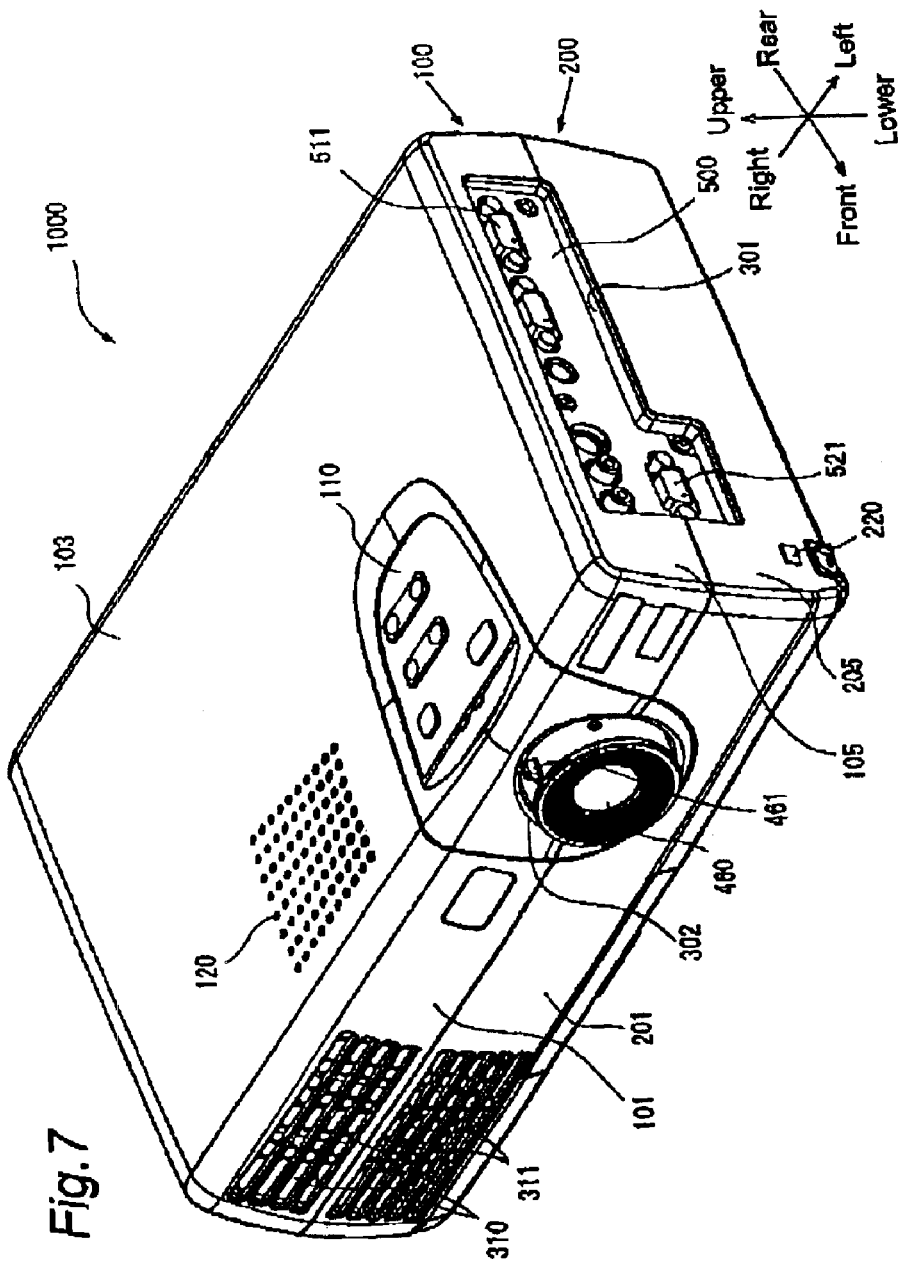
FIG. 7 is a top, front perspective view of the projector 1000 of the fourth exemplary embodiment.

FIG. 7 is a top, front perspective view of the projector 1000. Hereinafter each direction, such as upper, lower, left, right, front, rear, is used to explain the construction of the apparatus. The projector 1000 includes an exterior package or a chassis that is produced by injection molding of synthetic resins in the shape like a rectangular box. Major parts of the projector 1000 are built in the exterior package. The exterior package is assembled by combining the upper package 100 and the lower package 200. By way of example, the left side surfaces 105, 205 of the upper package 100 and the lower package 200 are combined together with other surfaces of the exterior package to define a continuous left side of the exterior package.

Speaker perforations 120 for phonetic output and an operation panel 110 are installed in a front area of the top surface 103 of the upper package 100. Pressing each function button of the operation panel 110 causes a control signal corresponding to the function to be transmitted to internal control boards. The function may include the following: cooling control to cool down the projector 1000; changing the settings to protect images; controlling the volume of the phonetic output; and switching over input sources of image data.

An interface panel 500 is installed facing to an opening 301 in the left side surface 105. The interface panel 500 mounts connectors 511, 521 to connect peripheral devices and such. These connectors 511, 521 are respectively connected to a main board and an interface board internally installed in the exterior package.

Installed in the left side surface 205 is a stay adjusting switch 220 that adjusts the tilted state of the projector 1000. The stay adjusting switch 220 is connected to the internal control boards and transmits control signals thereto according to pressing/stop-pressing. The movement of projector 1000 according to the operation of the stay adjusting switch 220 is described later.

Exhaust slots 310, with a safety cover 311 attached thereto, are respectively formed in the right portion of the front surfaces 101, 201 of the upper package 100 and the lower package 200. In the left portion of the front surfaces 101, 201, close to the operation panel 110, a circular opening 302 is formed. A projection lens 460 is arranged in the exterior package with one end exposed outward from the opening 302. Around the exposed portion of the projection lens 460 is mounted a focus knob 461 to manually adjust the focus.

Figure 8:
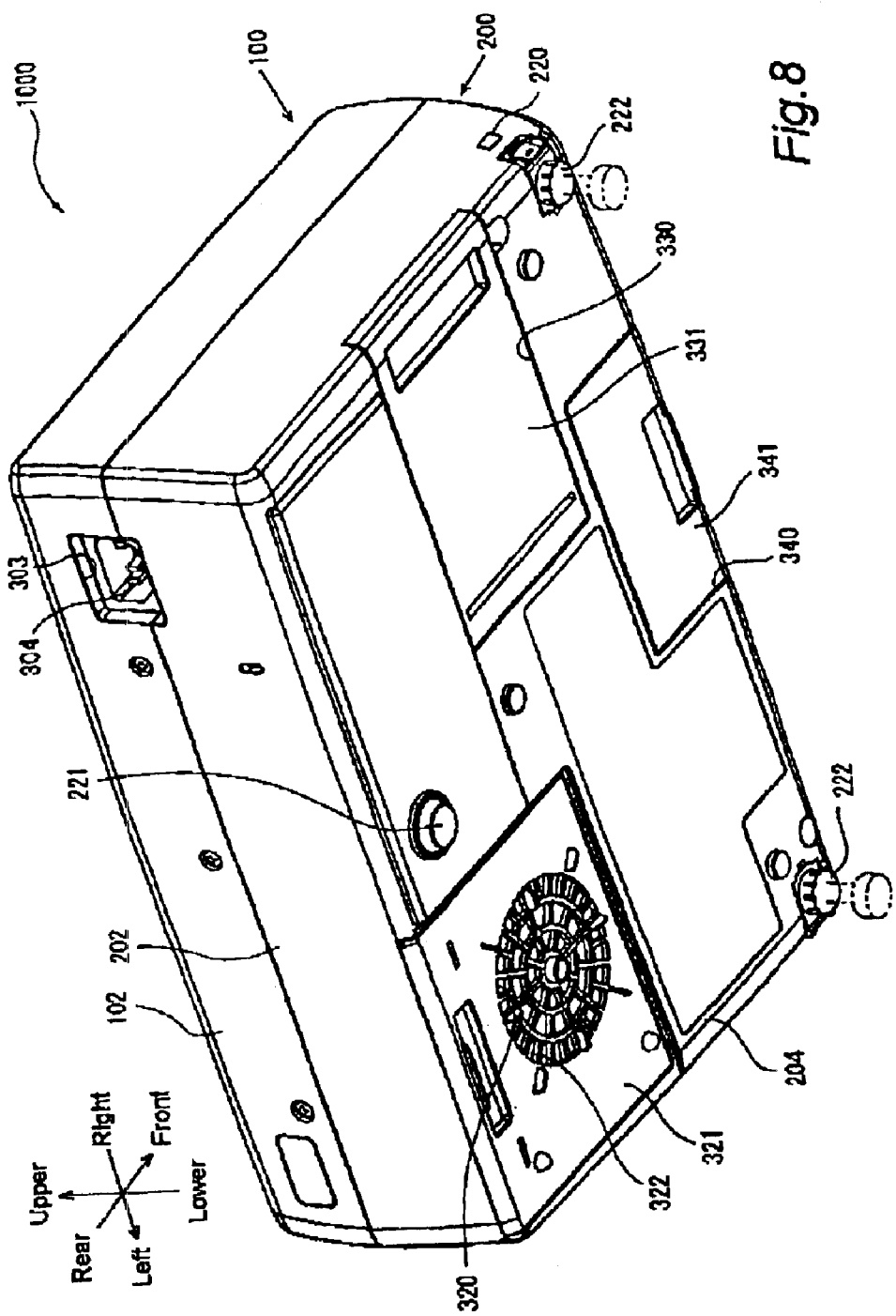
FIG. 8 is a bottom, rear perspective view of the projector 1000.

FIG. 8 is a bottom, rear perspective view of the projector 1000. In right portion of rear surfaces 102, 202 of the upper package 100 and the lower package 200, a rectangular opening 303 is formed to receive an inlet connector 304 to which electric power cable is connected.

In right middle portion of the lower package 200, a rectangular opening 330 is formed to receive a detachable lamp cover 331. A light source lamp is mounted in the opening 330 inside the projector 1000 so as to make it easy to change the light source lamp by detaching the lamp cover 331.

In a portion near the left rear surface of the bottom surface 204, an air inlet 322 to let cold air into the projector 1000 is formed in the exterior package and an air inlet cover 321 is attached thereto. In the air inlet cover 321, openings 320 are formed facing the air inlet 322. In the openings 320, an air filter is attached to reduce or prevent dust from coming into the projector 1000.

A rear stay 221 is mounted in the rear middle portion of the bottom surface 204. Two front stays 222 are respectively mounted in the right and left corner of the front portion of the bottom surface 204. The projector 1000 is supported with three supporting point, that is, the rear stay 221 and the two front stays 222.

Each front stay 222 is linked to a stepping motor. Pressing the respective stay adjusting switch 220, as described above, causes the stepping motor to drive the front stay 222, thereby extending and contracting the front stay 222. The stepping motor first drives in a direction that extends the stay during pressing the stay adjusting switch 220, and then drives in the reverse direction to contract the stay after the length of the stay reaches a maximum extension. The stepping motor again drives in a reverse direction to extend the stay after the length of the stay reaches a minimum contraction. In this embodiment, the stay adjusting switch 220 is used both to extend and contract the stay. However, various configuration are applicable as follows: mounting respective switches for extending and contracting the stay; and applying a switch that can accept both instructions of extending and contracting according to operation manners, such as a seesaw type switch and a lever.

Stopping the press of the stay adjusting switch 220 turns the switch for the stepping motor off and makes the front stay 222 stop extending and contracting. Respective adjustments of the front stays 222 can adjust the tilted state and the rotated state of the projector 1000, thereby adjusting the position of projected images. Extending the front stay 222 performs a tilted projection in which the normal axis of the screen and the light axis of the light flux projected from the projection lens 460 are not parallel. According to these adjustment functions, the front stays 222 and the stay adjusting switches 220 can be called an elevation adjustment mechanism.

In the front middle portion of the bottom surface 204, a concave portion 340 is formed to put a remote controller therein. A cover 341 slidable in a front-to-rear direction is attached to the concave portion 340.

Figure 9:
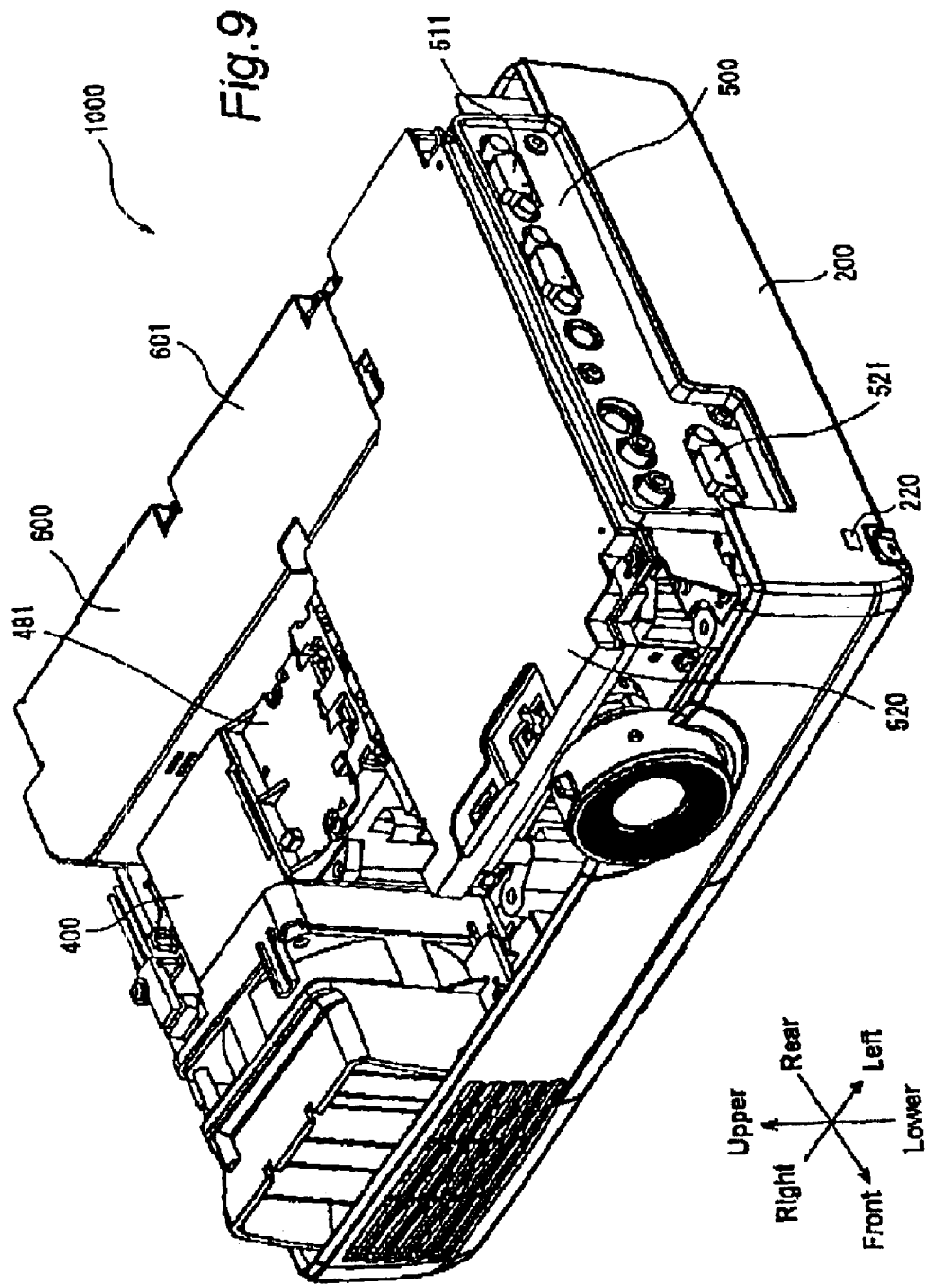
FIG. 9 is a perspective view of the projector 1000 with the upper case 100 removed.

FIG. 9 is a perspective view of projector 1000 with the upper case 100 removed. In the exterior package, an electric power unit 600 is arranged in a right-to-left direction along the rear surface of the exterior package.

The electric power unit 600 includes an electric power source and a lamp driving circuit or a ballast. The electric power source supplies electric power, which is received through the electric power cable connected to the inlet connector, to the lamp driving circuit and the control boards. The lamp driving circuit supplies the electric power received from the electric power source to the light source lamp.

The front surface, rear surface, and top surface of the electric power source and the lamp driving circuit are covered with a shield 601 that is made of metal such as aluminum. The shield 601 has functions as follows: guiding cold air as a duct and reducing or preventing electromagnetic noise generated in the electric power source and the lamp driving circuit from leaving.

The control boards are arranged under the metal shield 520. In this embodiment, a main board and an interface board is arranged as the control boards. The main board, which mounts a CPU and the connector 511, is horizontally arranged under the shield 520. The interface board, which mounts the connector 521, is arranged under the main board along the left surface of the exterior package.

The main board performs various controls as follows: controlling the LC panels of the optical unit 400 according to image data that is input through the connectors 511, 521; performing a predetermined extending process to audio data input from a peripheral device and output it from the speaker; controlling the revolving speed and driving time period of the cooling fan; and executing the keystone correction for the image projected onto the screen.

A gyro sensor is mounted on the main board close to the projection lens 460, so that the gyro sensor can detect the tilted state in the front-to-rear direction of the projector 1000 or an elevation angle that is required for the keystone correction. Detail illustration of the gyro sensor is omitted. The gyro sensor may also detect a tilted state in the right-to-left direction or a roll angle.

Various sensors besides the gyro sensor are applicable to detect the elevation angle, such as various types of angle sensors using electromagnetic effect, variation of resistance, and light. The elevation angle may be calculated according to the extending length of the front stay 222.

Figure 10:
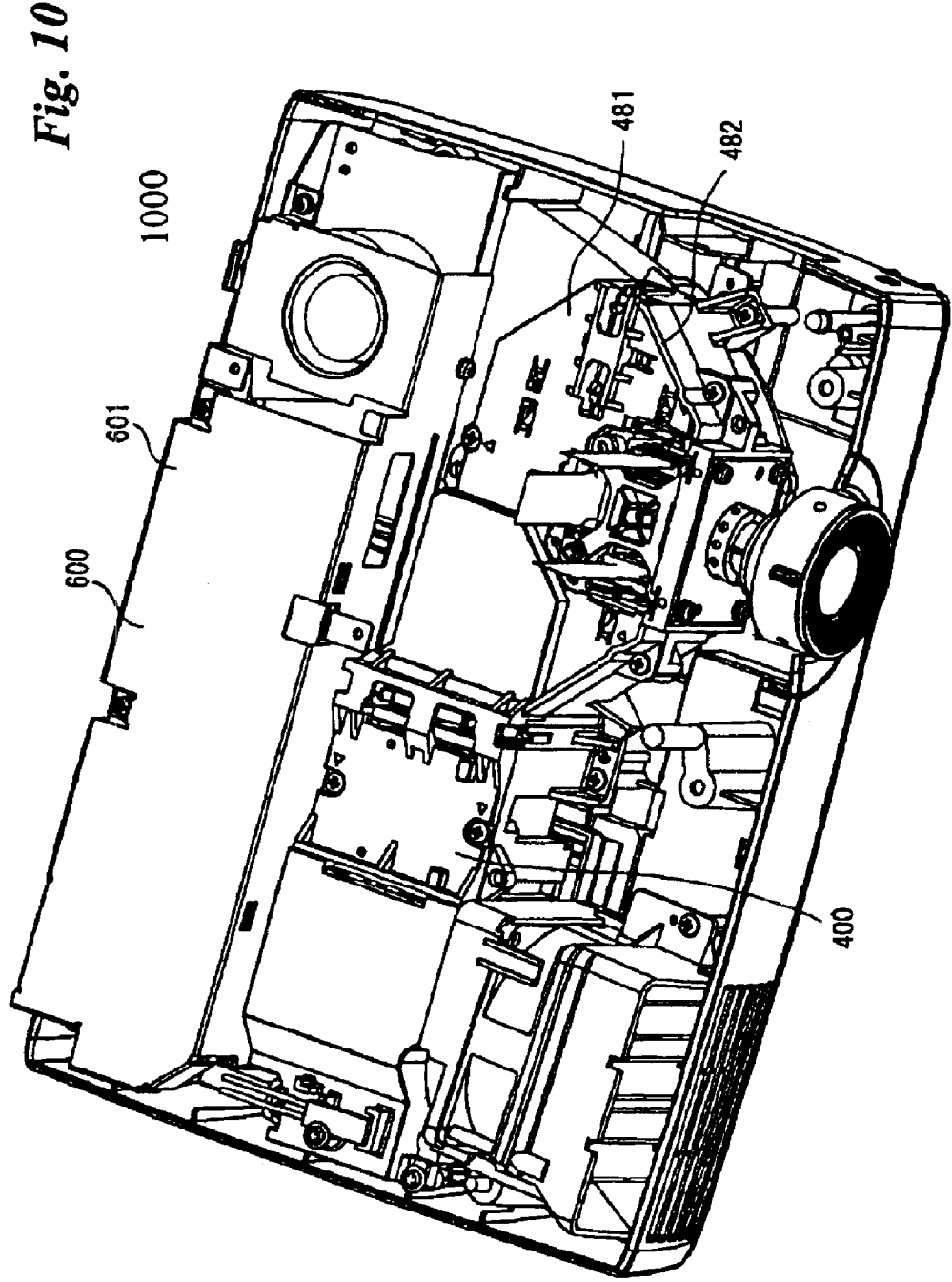
FIG. 10 is a perspective view of the projector 1000 with the shield and the control boards removed.

FIG. 10 is a perspective view of projector 1000 with the shield 520 and the control boards removed. As illustrated in the figure, the optical unit 400, whose plan view is approximately "L" shape, is arranged in front of the electric power unit 600. The main board described above is arranged so as to touch with an upper edge 482 of an upper light guide 481 of the optical unit 400.

(D2) Detailed Construction of Optical Unit

Figure 11:
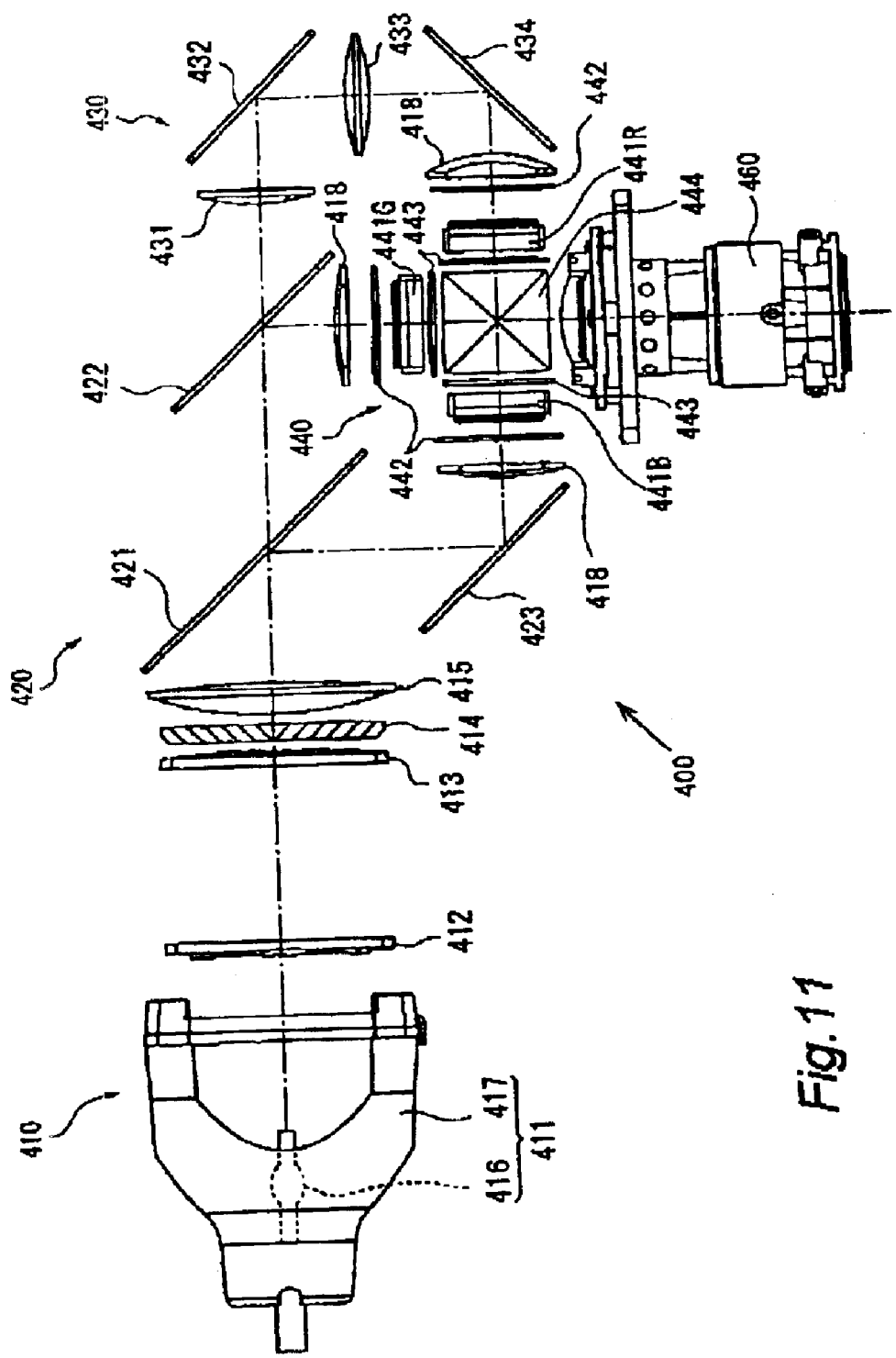
FIG. 11 is a schematic of the optical unit 400 of the projector 1000.

FIG. 11 is a schematic of the optical unit 400 of projector 1000. The optical unit 400 performs an extended projection of an optical image that is formed by modulating the light flux illuminated from the light source 411 according to image data. The optical unit 400 includes an integrator illumination optical unit 410, a color separation optical unit 420, a relay optical unit 430, an optical device 440 and the projection lens 460.

The integrator illumination optical unit 410 uniformly illuminates the image generation area of three LC panels 441R, 441G, 441B corresponding to red light, green light, and blue light, respectively. The integrator illumination optical unit 410 includes a light source 411, a first lens array 412, a second lens array 413, a polarization converting device 414 and an overlay lens 415. Hereinafter the LC panels 441R, 441G, 441B maybe generically called as LC panel 441.

The light source 411 includes a light source lamp 416 as a light emitting source and a reflector 417, collimates radial light illuminated from the light source lamp 416 and reflected by the reflector 417, and emits the collimated light. A high pressure hydrargyrum lamp is applied to the light source lamp 416, but a metal halide lamp and a halogen lamp are also applicable. A paraboloid mirror is applied to the reflector 417, but a combination of a concave lens for collimation and an ellipsoidal mirror are also applicable.

In the first lens array 412, small lenses, which are approximately rectangular shape in a view along the light axis, are arranged in a matrix. Each small lens divide the light flux illuminated from the light source lamp 416 into a plurality of partial light flux. The shape of the small lenses is approximately analogous to that of the image generation area of the LC panel 441. Accordingly, in a case where the aspect ratio, which is a ratio of width to height, of the LC panel 441 is 4:3, the small lenses have the same aspect ratio.

In the second lens array 413, as well as the first lens array 412, the small lenses are arranged in a matrix. This second lens array 413 makes each light flux, which is illuminated from the small lens of the first lens array 412, focus and produce an image on the LC panel 441 using the overlay lens 415.

The polarization converting device 414 is arranged between the second lens array 413 and the overlay lens 415. The polarization converting device 414 converts the light transmitting from the second lens array 413 into a single kind of polarizing beam. Each partial light flux converted by the polarization converting device 414 is overlaid onto the LC panel 441 by the overlay lens 415. While LC panels usually utilize one kind of polarizing beam, the function of the polarization converting device 414 can enhance the effectiveness of utilization of the light illuminated from the light source as a mixture of various kind of polarizing beams by converting them into a single kind of polarizing beam. A polarization converting device, e.g., disclosed in JP1996-304739A1 is applicable.

The color separation optical unit 420 includes two dichroic mirrors 421, 422 and a reflecting mirror 423, and divides partial light flux, which is illuminated from the integrator illumination optical unit 410, into three colors of light which are red (R), green (G), and blue (B).

The dichroic mirror 421 transmits red light and green light out of the light, which is illuminated from the integrator illumination optical unit 410, and reflects blue light. The reflected blue light is again reflected on the reflecting mirror 423, goes through the field lens 418 and gets to the LC panel 441B for blue color.

The dichroic mirror 422 selectively reflects green light. Accordingly, out of the light transmitted from the dichroic mirror 421, green light is reflected by the dichroic mirror 422, goes through the field lens 418 and gets to the LC panel 441G for green color, while red light transmits through the dichroic mirror 422, goes through the relay optical unit 430 and the field lens 418, and gets to the LC panel 441R for red color.

The field lens 418 makes each portion of the light flux, which is illuminated from the second lens array 413, parallel to the center axis of the light flux or chief ray as do the field lenses 418 that are arranged in the illuminated sides of the other LC panels 441G, 441R.

The relay optical unit 430 guides the red light to the LC panel 441R using the incident lens 431, the relay lens 433 and the reflecting mirrors 432, 434. The relay optical unit 430 reduces divergence loss of the light flux transmitting from the incident lens 431 to the field lens 418. The reason why the relay optical unit 430 is applied for red light is that the light path of the red light is maximum and the long light path tends to cause the divergence loss. In other modifications, the relay optical unit 430 may be applied to colors other than the red color, such as blue color.

The optical device 440 modulates the incident light flux according to the image data and forms a color image, and includes the following: three incident polarizing beam plates 442 into which each color light separated by the color separation optical unit 420 is incident; the LC panels 441R, 441G, 441B as light modulation devices that are respectively arranged behind the incident polarizing beam plates 442; three projecting polarizing beam plates 443 that are respectively arranged behind the LC panels 441R, 441G, 441B; and a cross dichroic prism 444 as a color integrating optical unit.

The LC panels 441R, 441G, 441B may apply, e.g., TFT-type which uses polysilicon TFTs as switch devices.

The incident polarizing beam plates 442 transmits the polarizing beam only in one direction out of each color light split by the color separation optical unit 420 and absorbs other light flux. Various types are applicable as follows: a polarizing beam membrane attached onto a substrate of sapphire glass; and a polarizing beam membrane attached onto the field lens 418 instead of the substrate.

The projecting polarizing beam plates 443, as well as the incident polarizing beam plates 442, transmits the polarizing beam only in one direction transmitted from the LC panel 441 and absorbs other light flux. The projecting polarizing beam plate 443 may be formed by a polarizing beam membrane attached to the cross dichroic prism 444.

The incident polarizing beam plates 442 and the projecting polarizing beam plates 443 are arranged so that respective polarizing beam axis cross each other at right angles.

The cross dichroic prism 444 integrates optical images, which are formed by modulating respective color lights illuminated from the projecting polarizing beam plates 443, into a color image. In the cross dichroic prism 444, dielectric multi-layer membranes respectively reflect red light and blue light and are arranged in approximately an "X" shape along surfaces of four right angle prisms in order to integrate three colors of light.

Figure 12:
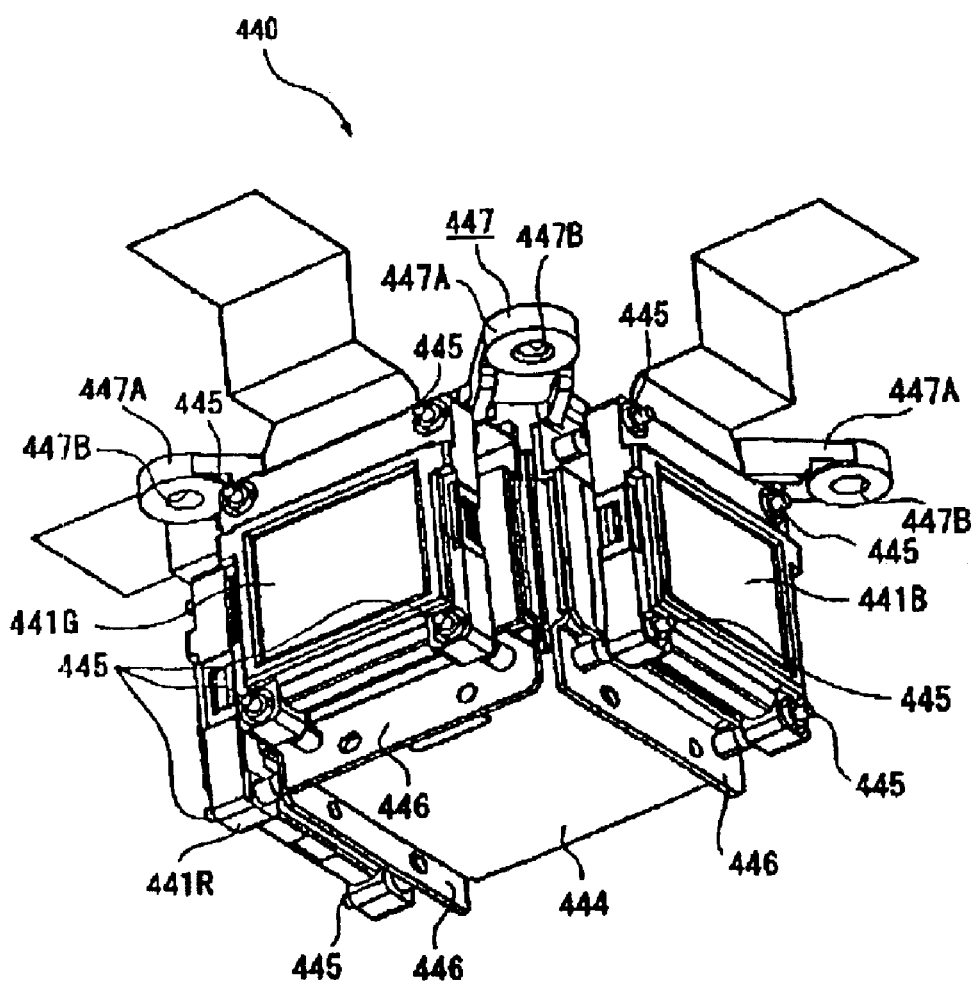
FIG. 12 is a perspective view of the optical device 440 of the projector 1000.

FIG. 12 is a perspective view of the optical device 440 of the projector 1000. The LC panel 441, the projecting polarizing beam plates 443 and the cross dichroic prism 444 described above are combined into a unit called an optical device 440.

In the optical device 440, a fixing plate 447, which is made of synthetic resin, is fixed onto the top surface of the cross dichroic prism 444. Four arms 447A, in which circular holes 447B are formed, are extended from the fixing plate 447.

In the incident surface of the cross dichroic prism 444, metallic support plates 446 are attached to support the projecting polarizing beam plates 443. In the incident surface of each support plate 446, four pins 445 are attached, which are made of transparent plastic and support the LC panels 441R, 441G, 441B. Between each support plate 446 and the LC panel 441, a slit of predetermined width is formed to guide cooling air.

Figure 13:
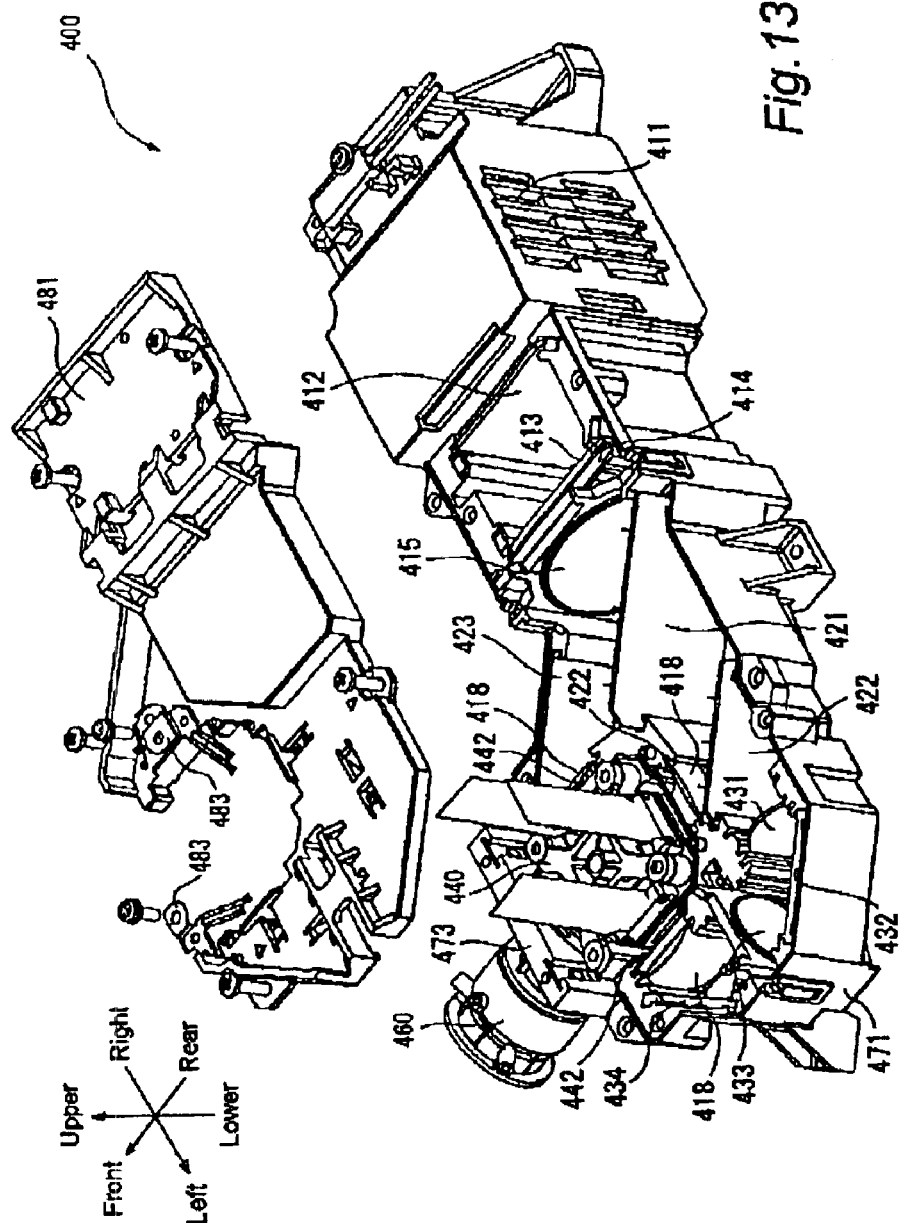
FIG. 13 is an exploded perspective view of the optical unit 400 of the projector 1000.

FIG. 13 is an exploded perspective view of the optical unit 400 of the projector 1000. The optical unit 400 includes an inner package that comprises a lower package 471 whose shape is approximately "L" in its plan view, and an upper light guide 481 to cover the upper opening of the lower package 471. Each optical part described in FIGS. 5 and 6, is slid down into each slit formed in the lower package 471.

One end of the lower package 471 contains the light source 411. In the other end, the projection lens 460 is fixed by screws through a head 473.

The optical device 440 is fixed onto the lower package 471 by screws through springs 483 of the upper light guide 481. Two springs 483 forces the field lens 418 and the incident polarizing beam plates 442 downwards.

(D3) General Construction of Control Unit

Figure 14:
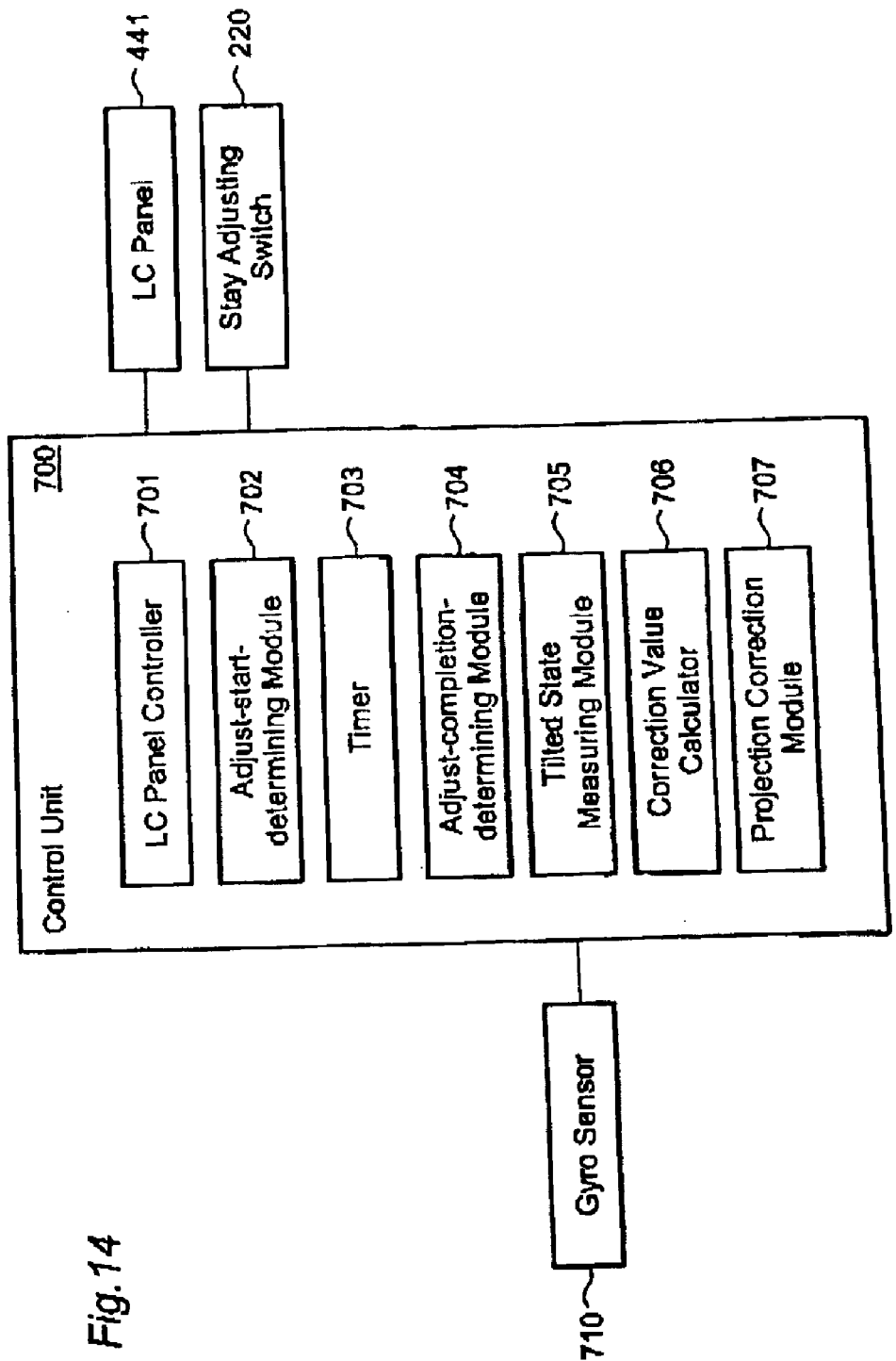
FIG. 14 is a schematic that shows the function blocks of the control unit 700 of the projector 1000.

FIG. 14 is a schematic that shows the function blocks of the control unit 700 in the projector 1000. The control unit 700 is configured as a microcomputer with CPU, RAM, and ROM on the main board. Each module illustrated in the control unit 700 may be constructed by either hardware or control software that is stored in the ROM and executed by the CPU.

In FIG. 14, function blocks executing the keystone correction are mainly illustrated and other function blocks are omitted. In the figure, some modules which transmit and receive various signals from and to the control unit 700 are also illustrated, such modules include a gyro sensor 710, the LC panel 441, and the stay adjusting switch 220.

The LC panel controller 701 controls driving of the LC panel 441 according to the image data input from peripheral devices. In this embodiment, the LC panel controller 701 is configured with a image processing circuit in which CPU and memories are installed.

The adjust-start-determining-module 702 detects the pressing of the stay adjusting switches 220 and determines the start of adjustment of the tilted state of the projector 1000 according to the detection. The adjust-start-determining-module 702 outputs a start-instruction to measure an elapsed time to a timer 703 in the case where the start of adjustment is determined.

The adjust-completion-determining-module 704 detects the stop of the pressing of either one of the stay adjusting switches 220 and determines completion of adjusting the tilted state of the projector 1000 according to the detection. The adjust-completion-determining-module 704 outputs a stop-instruction to measure the elapsed time to the timer 703 in the case where the completion is determined.

The timer 703 measures the elapsed time for adjusting the tilted state of the projector 1000, that is, the time period from the start-instruction to the stop-instruction output by the adjust-start-determining-module 702. In the case where the elapsed time exceeds a predetermined threshold, the timer 703 instructs the tilted state measuring module 705 to measure the tilted state or the elevation angle. The threshold may be arbitrarily set. For example, it can be set based on a required time from the start of operation of the stay adjusting switch 220 to achieve some significant change of the tilted state.

The tilted state measuring module 705 measures the elevation angle according to the sensor signal from the gyro sensor 710 in response to the instruction by the timer 703. And the tilted state measuring module 705 outputs the elevation angle to the correction value calculator 706.

The correction value calculator 706 calculates a correction value for the keystone correction based on the elevation angle. The projection correction module 707 executes the keystone correction according to the correction value for the image data input from peripheral devices, generates the corrected image signal and outputs it to the LC panel controller 701.

(D4) Keystone Correction

Figure 15:
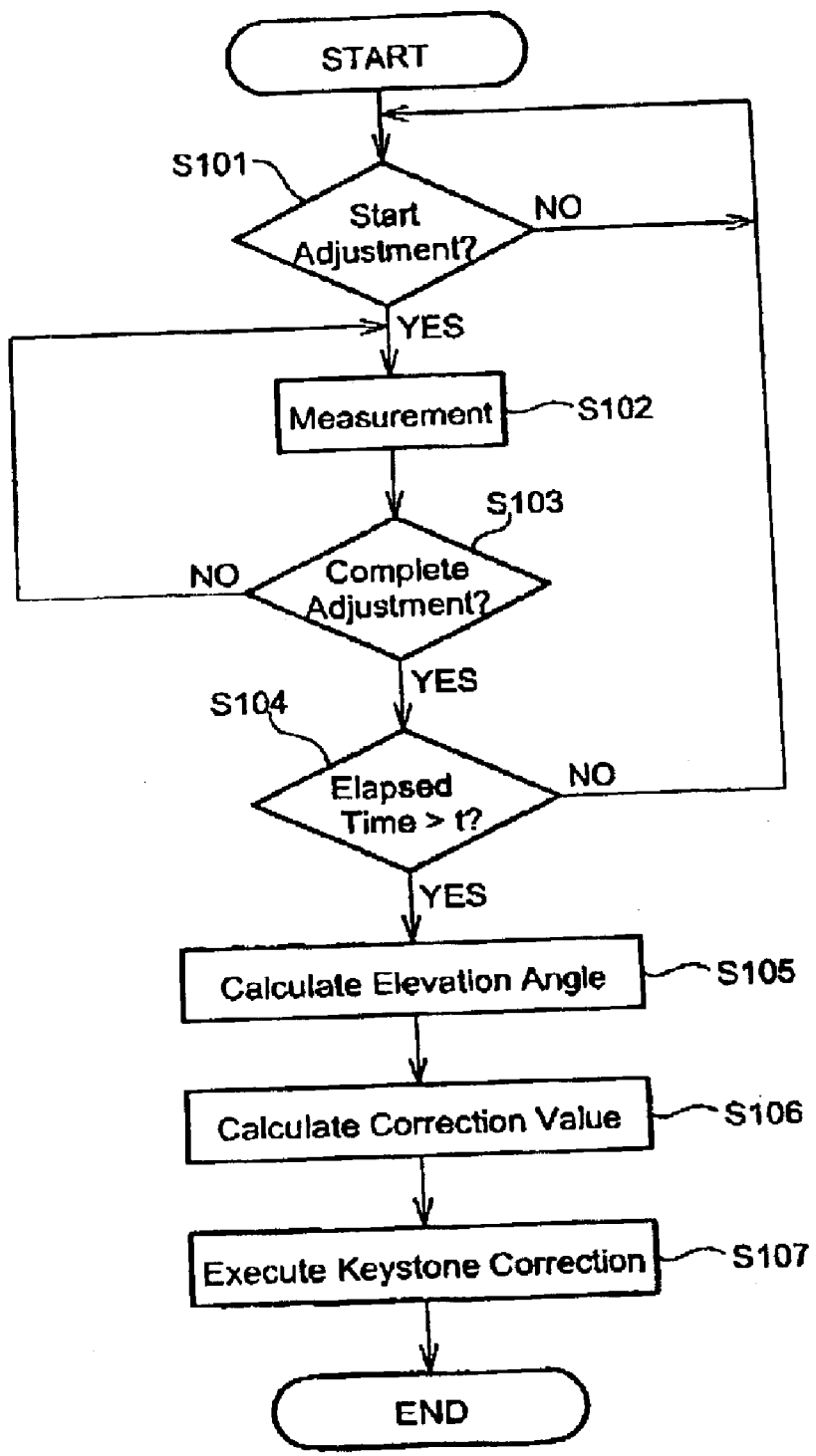
FIG. 15 is a flowchart of a keystone correction process in the projector 1000.

FIG. 15 is a flowchart of a keystone correction process. This process is repeatedly executed by the control unit 700 during projection. First, the adjust-start-determining-module 702 determines whether or not the adjustment of the tilted state starts (Step S101). The start is determined in the case where the user presses the stay adjusting switch 220 to adjust the length of the front stay 222.

After starting the adjustment, the adjust-start-determining-module 702 outputs the start-instruction to the timer 703 and makes the timer 703 start measuring the elapsed time (Step S102).

Subsequently, the adjust-completion-determining-module 704 determines whether or not the adjustment of the tilted state is completed (Step S103). The completion is determined in the case where the user stops pressing the stay adjusting switch 220. After completion of the adjustment, the adjust-completion-determining-module 704 outputs the stop-instruction to the timer 703 and makes the timer 703 stop measuring the elapsed time.

The timer 703 compares the calculated elapsed time to predetermined threshold (Step S104). In the case where the elapsed time is not greater than the threshold, the control unit 700 determines pressing of the stay adjusting switch 220 as an erroneous operation and restart this process from the beginning. In the case the elapsed time is greater than the threshold, on the other hand, the control unit 700 determines the completion of the tilted state adjustment and instructs the tilted state measuring module 705 to measure the tilted state or the elevation angle.

The tilted state measuring module 705 inputs the sensor signal from the gyro sensor 710 and calculates the tilted angle or the elevation angle in response to the instruction (Step S105). The correction value calculator 706 calculates the correction value based on the elevation angle (Step S106). The projection correction module 707 executes the keystone correction based on the correction value (Step S107).

Figure 16:
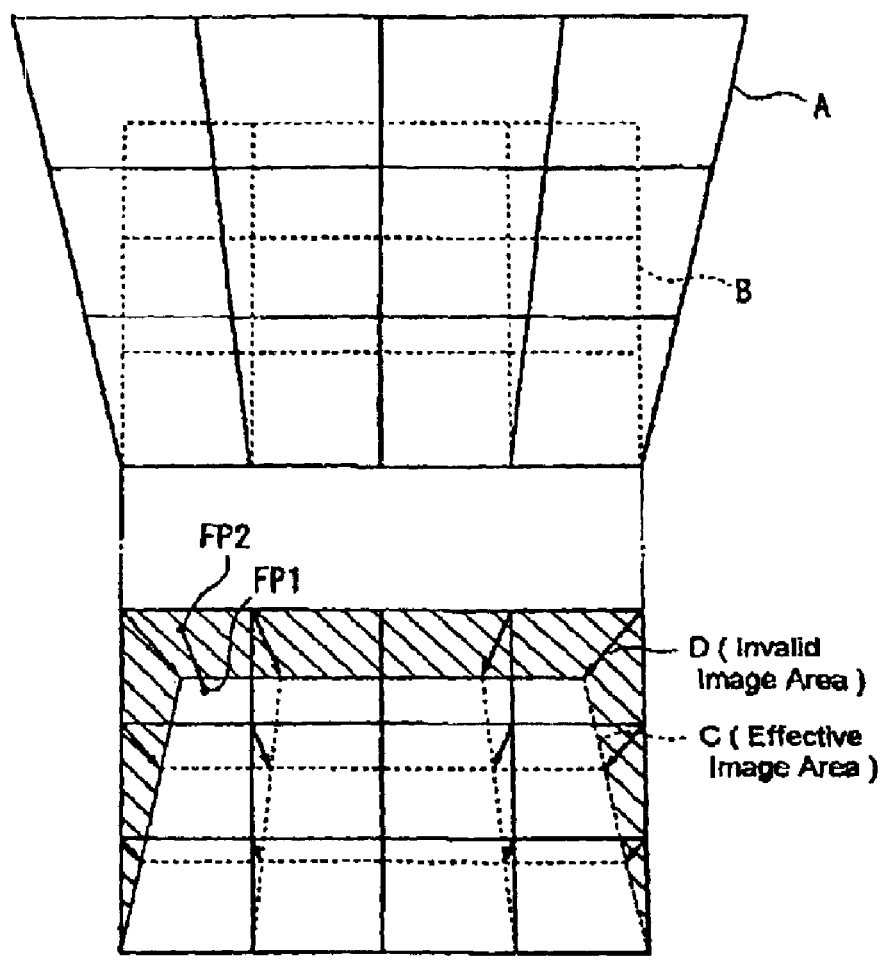
FIG. 16 is a schematic that shows the way to calculate a correction value of the optical image formed by the projector 1000.

FIG. 16 is a schematic that shows the way to calculate a correction value. In the upper part of the figure, a distortion image projected by a tilted projection is illustrated with solid lines and correct image B projected by non-tilted projection is illustrated with broken lines.

In the lower part of the figure, an image formed on the LC panel 441 is illustrated. In order to project an image equivalent to the image B by correcting the distortion of the image A, the distorted image A should be corrected to generate a reversely distorted image C on the LC panel 441. Hereinafter this image C is referred as to an "effective image C" and the area around it is referred as to an "invalid image D".

The correction value calculator 706 calculates the correction value, which means a positional relationship between an arbitrary pixel FP2 in the projected image and the pixel FP1 corresponding to the pixel FP2 in the corrected image, according to the elevation angle. The projection correction module 707 modifies the image signal of each arbitrary pixel FP1 in the effective image C according to the correction value to that of the pixel FP2 corresponding to the pixel FP1 in the original image data. Each pixel in the invalid image D, on the other hand, is set to the black signal. Outputting the corrected image signal to the LC panel controller 701 enables the keystone correction.

(D5) Effects of Third Exemplary Embodiment

The third embodiment has various effects as follows:

(1) The correction of the distorted image is automatically executed in response to the completion of adjusting the tilted state of the projector 1000. That can reduce the delay of the correction after the completion of adjusting.

(2) Since the correction is executed only in the case where the elapsed time exceeds the predetermined threshold, this can reduce erroneous execution of the correction in response to erroneous operations to the stay adjusting switch 220.

(3) Simple adjustment of the tilted state can be achieved by applying a simple structure in which just pressing the stay adjusting switch 220 extends and contracts the length of the front stay 222.

(4) Since the stay adjusting switches 220 and the front stays 222 are installed in both left and right side surfaces of the external package, these switches enable adjusting of the roll state in the left-to-right direction of the projector 1000 in addition to the tilted state in the front-to-rear direction.

(D6) Exemplary Modifications of Third Exemplary Embodiment

An exemplary modification of the third exemplary embodiment is described below. While the third embodiment determines the completion of adjusting and executes the keystone correction in a case where the operation of either stay adjusting switch 220 is completed, this exemplary modification executes the keystone correction in response to the completion of the operations of both stay adjusting switches 220. In this exemplary modification, the number of timers 703 to be installed are assumed to be the same number as that of the stay adjusting switches 220 in order to measure each elapsed time for the operation of each switch 220.

Figure 17:
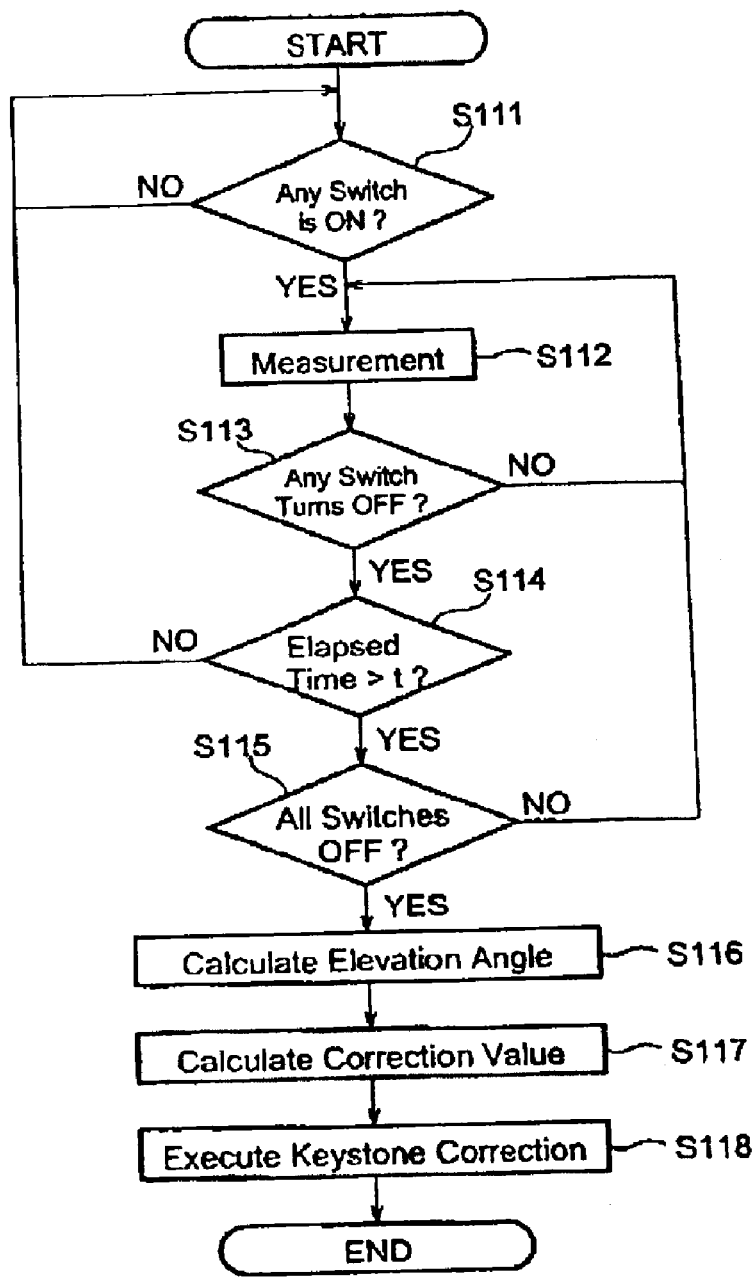
FIG. 17 is a flowchart of a keystone correction process of an exemplary modification in the projector 1000.

FIG. 17 is a flowchart of a keystone correction process of an exemplary modification. First, the adjust-start-determining-module 702 determines whether or not either stay adjusting switch 220 is on (Step S111). In the case where either stay adjusting switch 220 is on, the timer 703 corresponding to the on stay adjusting switch 220 starts measuring the elapsed time in response to the instruction by the adjust-start-determining-module 702 (Step S112).

Subsequently, in the case where either stay adjusting switch 220 turns off (Step S113), the adjust-completion-determining-module 704 makes the timer 703 corresponding to the off switch 220 stop measuring the elapsed time. The timer 703 compares the elapsed time to a predetermined threshold (Step S114). In the case where the elapsed time is not greater than the threshold, the control module 700 determines that the stay adjusting switch 220 is erroneously operated and restart this process from Step S111.

In the case where the elapsed time exceeds the predetermined threshold, the timer 703 determines that the operation to the switch 220 is completed. The adjust-completion-determining-module 704 repeatedly performs above-described process until all operations to the all switches, which are determined "on" at Step S111, are completed (Step S115).

After the completion of the all operations to the stay adjusting switches 220, the control unit 700, as well as in the third exemplary embodiment, performs the following processes: determining the elevation angle (Step S116); calculating the correction value (Step S117); and executing the keystone correction (Step S117).

The exemplary modification described above achieves the following effect in addition to the effects of the third exemplary embodiment. That is, since the keystone correction is executed only when the all operations to the stay adjusting switches 220 are completed, it is possible to avoid erroneous execution of the correction before the completion of all operations to the stay adjusting switches 220.

(D7) Other Exemplary Modifications of Third Exemplary Embodiment

Though the embodiment executes the correction only when the elapsed time exceeds the predetermined threshold, the correction may be executed regardless of the elapsed time. Manual instruction is applicable to execute the correction, in addition to the automatic correction, which is executed in response to the completion of adjusting the tilted state.

While the number of the stay adjusting switches 220 and the front stays 222 is two in the third exemplary embodiment, the number may be one or more than two. The configuration may also be one in which a single stay adjusting switch 220 can adjust a plurality of the front stays 222 in a coupled manner.

The number of the LC panels of the projector 1000 may be one, two or more than three. The LC panel may also be various types, such as a transmitting type and a reflecting type. Various devices, such as a device using micro-mirrors, are applicable as the light modulation device instead of the LC panel.

A front type projector which projects images from the front side of the screen is described in the third exemplary embodiment. However, this invention can be applied to rear type projectors which project images from the rear side of the screen.

The above exemplary embodiments and exemplary modifications are to be considered in all aspects as illustrative and not restrictive. Many modifications, changes, and alterations may be made to the above without departing from the scope or spirit of the present invention. For example, any of the above processing may be performed by hardware, instead of the software.

What is claimed is:

1. A projector performing a keystone correction of a projected image during a tilted projection, comprising:
   a trigger determination module configured to determine a predetermined trigger state included in normal procedure to project an image except for an instruction to perform a keystone correction;
   an elevation detecting module configured to detect an elevation angle of the projector; and
   a keystone correction module configured to perform a keystone correction based on the elevation angle in response to the trigger state;
   a light source lamp; and
   an light-on detecting module configured to detect a light-on state of the light source lamp, the trigger state including the light-on state.

2. The projector in accordance with claim 1, wherein the elevation angle is input into the keystone correction module after a predetermined time has passed.

3. A method for correcting keystone distortion of a projected image during a tilted projection of a projector, comprising:
   determining a predetermined trigger state included in normal procedure to project an image except for an instruction to perform a keystone correction;
   detecting an elevation angle of the projector; and
   performing a keystone correction based on the elevation angle in response to the trigger state; and
   detecting a light-on state of a light source lamp of the projector, the trigger state including the light-on state.

4. The method in accordance with claim 3, wherein the elevation angle is input after a predetermined time has passed.

5. A method for controlling a projector, which includes an optical unit that modulates a light flux illuminated from a light source according to image data so as to form an optical image and performs an extended projection of the optical image, and an elevation adjustment mechanism to adjust the tilted state of the optical unit, comprising:
   an adjust-completion-determining-step determining a completion of an operation for the elevation adjustment mechanism;
   a tilted state measuring step measuring a tilted state of the optical unit in response to a determination of the completion of the operation; and
   a projection correction step executing a distortion correction of the optical image according to a measured tilted state; and
   a time measuring step measuring an elapsed time from the start of an adjustment by the elevation adjustment mechanism, the correction is executed in a case where the elapsed time exceeds a predetermined threshold in the projection correction step.

6. A computer program to control a projector, the computer program stored in a computer readable recording medium, the projector including an optical unit that modulates a light flux illuminated from a light source according to an image data so as to form an optical image and performs an extended projection of the optical image, and an elevation adjustment mechanism to adjust a tilted state of the optical unit, the computer program, comprising:
   an adjust-completion-determining-code determining completion of an operation for the elevation adjustment mechanism;
   a tilted state measuring code measuring the tilted state of the optical unit in response to a determination of the completion of the operation;
   a projection correction code executing a distortion correction of the optical image according to the measured tilted state; and
   a time measuring code measuring an elapsed time from a start of an adjustment by the elevation adjustment mechanism, the projection correction code executing the correction in a case where the elapsed time exceeds a predetermined threshold.

7. A projector performing a keystone correction of a projected image during a tilted projection, comprising:
   a trigger determination module configured to determine a predetermined trigger state included in normal procedure to project an image except for an instruction to perform a keystone correction;
   an elevation detecting module configured to detect an elevation angle of the projector;
   a keystone correction module configured to perform a keystone correction based on the elevation angle in response to the trigger state; and
   an elevation adjustment mechanism configured to adjust the elevation angle of the projector, the trigger state including an operation of the elevation adjustment mechanism,
   the elevation angle being inputted into the keystone correction module after a predetermined time has passed.

8. A projector performing a keystone correction of a projected image during a tilted projection, comprising:
   a trigger determination module configured to determine a predetermined trigger state included in normal procedure to project an image except for an instruction to perform a keystone correction;
   an elevation detecting module configured to detect an elevation angle of the projector; and
   a keystone correction module configured to perform a keystone correction based on the elevation angle in response to the trigger state, the trigger state including a variation of the elevation angle of the projector,
   the elevation angle being inputted into the keystone correction module after a predetermined time has passed.

9. A method for correcting keystone distortion of a projected image during a tilted projection of a projector, comprising:
   determining a predetermined trigger state included in normal procedure to project an image except for an instruction to perform a keystone correction;
   detecting an elevation angle of the projector; and
   performing a keystone correction based on the elevation angle in response to the trigger state, the trigger state including an operation of an elevation adjustment mechanism, which is equipped with the projector to adjust the elevation angle,
   the elevation angle being inputted after a predetermined time has passed.

10. A method for correcting keystone distortion of a projected image during a tilted projection of a projector, comprising:

determining a predetermined trigger state included in normal procedure to project an image except for an instruction to perform a keystone correction;

detecting an elevation angle of the projector; and performing a keystone correction based on the elevation angle in response to the trigger state, the trigger state including a variation of the elevation angle, the elevation angle being inputted after a predetermined time has passed.

* * * * *